United States Patent
Suzuki

(10) Patent No.: US 7,857,091 B2
(45) Date of Patent: Dec. 28, 2010

(54) TRANSMISSION AND VEHICLE HAVING TRANSVERSELY MOUNTED TRANSMISSION AND ENGINE ARRANGED IN AXIAL DIRECTION THEREOF

(75) Inventor: Hiroyuki Suzuki, Nishio (JP)

(73) Assignee: Aisin Ai Co., Ltd., Nishio-Shi, Aichi-Ken (JP)

( * ) Notice: Subject to any disclaimer, the term of this patent is extended or adjusted under 35 U.S.C. 154(b) by 103 days.

(21) Appl. No.: 12/208,704

(22) Filed: Sep. 11, 2008

(65) Prior Publication Data

US 2009/0065282 A1 Mar. 12, 2009

(30) Foreign Application Priority Data

Sep. 11, 2007 (JP) .............................. 2007-235821

(51) Int. Cl.
*F16H 3/093* (2006.01)
*B60K 17/00* (2006.01)

(52) U.S. Cl. ...................................... 180/374; 180/337

(58) Field of Classification Search ................ 180/337, 180/374, 347, 343; *F16H 3/093; B60K 17/00*
See application file for complete search history.

(56) References Cited

FOREIGN PATENT DOCUMENTS

| JP | 2002-070960 A | | 3/2002 |
|----|---------------|---|--------|
| KR | 2006056671 A | * | 5/2006 |

* cited by examiner

*Primary Examiner*—Lesley Morris
*Assistant Examiner*—Keith Frisby
(74) *Attorney, Agent, or Firm*—Buchanan Ingersoll & Rooney PC

(57) ABSTRACT

A vehicle includes an engine, a pair of side frames extending along a vehicle body in front-rear direction of the vehicle, a transmission adapted to be axially connected with the engine and adapted to be transversely mounted on a vehicle body, includes an input shaft, a first counter shaft, a second counter shaft, a first gear mechanism, a second gear mechanism, a third gear mechanism, and a transmission case, wherein the first and third gear mechanisms are arranged close to the engine, the second gear mechanism is arranged more distant from the engine, the second counter shaft is arranged above the input and the first counter shaft, and the transmission case forms a cut-out portion at an upper portion of the back wall portion of the transmission case.

4 Claims, 4 Drawing Sheets

TRANSMISSION AND VEHICLE HAVING TRANSVERSELY MOUNTED TRANSMISSION AND ENGINE ARRANGED IN AXIAL DIRECTION THEREOF

CROSS REFERENCE TO RELATED APPLICATIONS

This application is based on and claims priority under 35 U.S.C. §119 to Japanese Patent Application 2007-235821, filed on Sep. 11, 2007, the entire contents of which is incorporated herein by reference.

FIELD OF THE INVENTION

The present invention relates to a vehicle having an engine and a transmission that are connected to each other in an axial direction thereof and that are transversely mounted on the vehicle relative to a vehicle body.

BACKGROUND

In order to downsize a transmission and increase output torque, for example, a transmission apparatus disclosed in JP2002-70960A, adapted to a front-engine front-drive type vehicle to which an engine and a transmission connected in an axial direction thereof are transversely mounted, includes an input shaft, two counter shafts and plural shift stage gear sets that are arranged in parallel to each other between the input shaft and each of the counter shafts, thereby shortening length of the transmission apparatus in an axial direction thereof without reducing number of shift stages. A transmission 1 illustrated in FIG. 4 has substantially the same structure as the transmission apparatus disclosed in the second embodiment of JP2002-70960A. As illustrated in FIG. 4, an input shaft 3a, first counter shaft 3b, a second counter shaft 3c and a reverse shaft 3d are arranged in parallel to each other within a transmission case 2. The first counter shaft 3b and the second counter shaft 3c are connected to output shafts 8a and 8b via reduction gear set 6a, 6b and 6c and a differential mechanism 7. A first forward movement gear switching unit 4A forming a 1st shift stage and a 2nd shift stage and a second forward movement gear switching unit 4B forming a 3rd shift stage and a 4th shift stage are arranged between the input shaft 3a and the first counter shaft 3b so that the second forward movement gear switching unit 4B is positioned farther away from an engine 10 than the first forward movement switching unit 4A. A third forward movement switching unit 4C forming a 5th shift stage and a 6th shift stage is arranged between the input shaft 3a and the second counter shaft 3c so as to be located at a position substantially corresponding to the position where the second forward movement gear switching unit 4B is arranged, in an axial direction of the input shaft 3a. Further, a reverse movement gear switching mechanism 4D forming a reverse shift stage is arranged between the input shaft 3a, the second counter shaft 3c and the reverse shaft 3d so as to be located at a position substantially corresponding to the position where the first forward movement gear switching unit 4A is provided, in the axial direction of the input shaft 3a. A back wall portion 2a of the transmission case 2, substantially corresponding to an area where input shaft 3a, the first counter shaft 3b and the second counter shaft 3c are arranged orthogonally relative to the back wall portion 2a, is formed to have a flat surface.

FIG. 5 schematically illustrates a forward portion of the vehicle, viewed in a lateral direction thereof, to which a driving unit is transversely mounted at the forward portion of a vehicle body. The driving unit is a unit in which the transmission 1 disclosed in JP2002-70960A is connected to the engine 10 in an axial direction thereof. As illustrated in FIG. 5, the driving unit is positioned between a pair of side frames 9 extending along both sides of the vehicle body in a front-rear direction thereof. In order to prevent the side frames 9 from interfering with a front axle, forward portions of the side frames 9 are curved upwardly. Hence, as illustrated in FIG. 5, the side frame 9 at the left side in FIG. 5 extends along immediate left of an upper portion of the back wall portion 2a of the transmission case 2 in the front-rear direction of the vehicle.

In order to increase collision safety and vehicle stiffness, a cross-section of each of the side frames 9 needs to be enlarged and a shape of each of the side frames 9 needs to be linearized. The side frames 9a having the enlarged cross-section and the linearized shape are illustrated with chain double-dashed lines in FIG. 5. As is evident from the position of the side frames 9a having the enlarged cross-section and illustrated with the chain double-dashed lines in FIG. 5, the side frame 9a at the left side in FIG. 5 interferes with an upper left portion of the back wall portion 2a of the transmission case 2, and the side frame 9a at the right side in FIG. 5 is positioned closer to the engine 10. Hence, the driving unit having axially connected engine 10 and transmission 1 may have difficulties when being transversely mounted on the vehicle body. A case where the driving unit, in which the engine and the transmission are connected in the axial direction thereof, is adapted to the front-engine front-drive type vehicle is described above. However, as is the case with the transmission adapted to the front-engine front-drive type vehicle described above, in a case where a similar driving unit is adapted to a rear-engine rear-drive type vehicle, the driving unit in which the transmission 1 and the engine 10 are connected in an axial direction thereof may have difficulties when being transversely mounted on the vehicle body because of the similar reasons explained above.

The transmission apparatus disclosed in JP2002-70960A suggests a modified transmission apparatus in which a portion of the back wall of the transmission case positionally corresponding to the second counter shaft is arranged closer to the engine, compared to a portion of the back wall positionally corresponding to the first counter shaft by eliminating one shift stage. However, in the transmission apparatus disclosed in JP2002-70960A, the portion on the back wall, corresponding to the second counter shaft and positioned closer to the engine than other portions of the back wall, is positioned at lower portion of the transmission case, thus resulting in creating a dead space at the back wall portion of the transmission case. Hence, even with the modified transmission apparatus disclosed in JP2002-70960A, the driving unit may have difficulties when being transversely mounted on the vehicle.

A need thus exists for a vehicle which is not susceptible to the drawback mentioned above.

SUMMARY OF THE INVENTION

According to an aspect of the invention, a vehicle includes an engine, a pair of side frames provided at the vehicle so as to extend along both sides of a vehicle body in front-rear direction of the vehicle, a transmission adapted to be axially connected with the engine and adapted to be transversely mounted on a vehicle body, includes an input shaft adapted to be rotatably driven by the engine, an output shaft connected to a driving wheel, a first counter shaft arranged in parallel to the input shaft and connected to the output shaft, a second counter shaft arranged in parallel to the input shaft and connected to the output shaft, a first gear mechanism arranged between the input shaft and the first counter shaft, the first gear mechanism having a first gear set, optionally a second gear set, and a first switching clutch to selectively establishing a power transmission path between the input shaft and the first counter shaft via the first gear set or, if present the second gear set, a second gear mechanism provided between the input shaft and the first counter shaft the second gear mechanism arranged in parallel with the first gear mechanism in an axial direction of the input shaft and having a third gear set, optionally a fourth gear set, and a second switching clutch selectively establish a power transmission path between the input shaft and the first counter shaft via the third gear set or, if present the fourth gear set, a third gear mechanism between the input shaft and the second counter shaft, the third gear mechanism having a fifth gear set, optionally a sixth gear set, and a third switching clutch to selectively establish a power transmission path between the input shaft and the second counter shaft via the fifth gear set or, if present the sixth gear set, and a transmission case supporting and covering the input shaft, the first counter shaft, the second counter shaft, the output shaft, the first gear mechanism, the second gear mechanism and the third gear mechanism, wherein the first gear mechanism and the third gear mechanism are arranged relatively close to the engine, the second gear mechanism is arranged at a position more distant from the engine than the first gear mechanism, and the second counter shaft is arranged above the input shaft and the first counter shaft, and the transmission case includes a back wall portion located at a position spaced from the engine and formed with a first back wall portion aligned with the first gear mechanism and the second gear mechanism and a second back wall portion corresponding to the third mechanism and located closer to the engine than the first back wall portion, thereby forming a cut-out portion at an upper portion of the back wall portion, and wherein the transmission is connected to the engine and transversely mounted on the vehicle body so that one of side frames extending along both sides of the vehicle body in a front-rear direction thereof extends through the cut-out portion, either a driving gear of the second gear set arranged close to the second gear mechanism relative to the first gear set at the first gear mechanism and provided at the input shaft, or a driving gear of the fourth gear set arranged close to the first gear mechanism relative to the third gear set at the second gear mechanism and provided at the input shaft serves also as a driving gear of the fifth gear set arranged at a position more distant from the engine relative to the sixth gear set at the third gear mechanism.

According to another aspect of the invention, a transmission adapted to be axially connected with the engine and adapted to be transversely mounted on a vehicle body, includes an input shaft adapted to be rotatably driven by the engine an output shaft connected to a driving wheel, a first counter shaft arranged in parallel to the input shaft and connected to the output shaft, a second counter shaft arranged in parallel to the input shaft and connected to the output shaft, a first gear mechanism arranged between the input shaft and the first counter shaft, the first gear mechanism having a first gear set, optionally a second gear set, and a first switching clutch to selectively establish a power transmission path between the input shaft and the first counter shaft via the first gear set or, if present the second gear set, a second gear mechanism provided between the input shaft and the first counter shaft the second gear mechanism arranged in parallel with the first gear mechanism in an axial direction of the input shaft and having a third gear set, optionally a fourth gear set, and a second switching clutch selectively establish a power transmission path between the input shaft and the first counter shaft via the third gear set or, if present the fourth gear set, a third gear mechanism between the input shaft and the second counter shaft, the third gear mechanism having a fifth gear set, optionally a sixth gear set, and a third switching clutch to selectively establish a power transmission path between the input shaft and the second counter shaft via the fifth gear set or, if present the sixth gear set, and a transmission case supporting and covering the input shaft, the first counter shaft, the second counter shaft, the output shaft, the first gear mechanism, the second gear mechanism and the third gear mechanism, wherein the first gear mechanism and the third gear mechanism are arranged relatively close to the engine, the second gear mechanism is arranged at a position more distant from the engine than the first gear mechanism, and the second counter shaft is arranged above the input shaft and the first counter shaft, and the transmission case includes a back wall portion located at a position spaced from the engine and formed with a first back wall portion aligned with the first gear mechanism and the second gear mechanism and a second back wall portion corresponding to the third gear mechanism and located closer to the engine than the first back wall portion, thereby forming a cut-out portion at an upper portion of the back wall portion, and wherein the transmission is connected to the engine and transversely mounted on the vehicle body so that one of side frames extending along both sides of the vehicle body in a front-rear direction thereof extends through the cut-out portion, either a driving gear of the second gear set arranged close to the second gear mechanism relative to the first gear set at the first gear mechanism and provided at the input shaft, or a driving gear of the fourth gear set arranged close to the first gear mechanism relative to the third gear set at the second gear mechanism and provided at the input shaft serves also as a driving gear of the fifth gear set arranged at a position more distant from the engine relative to the sixth gear set at the third gear mechanism.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
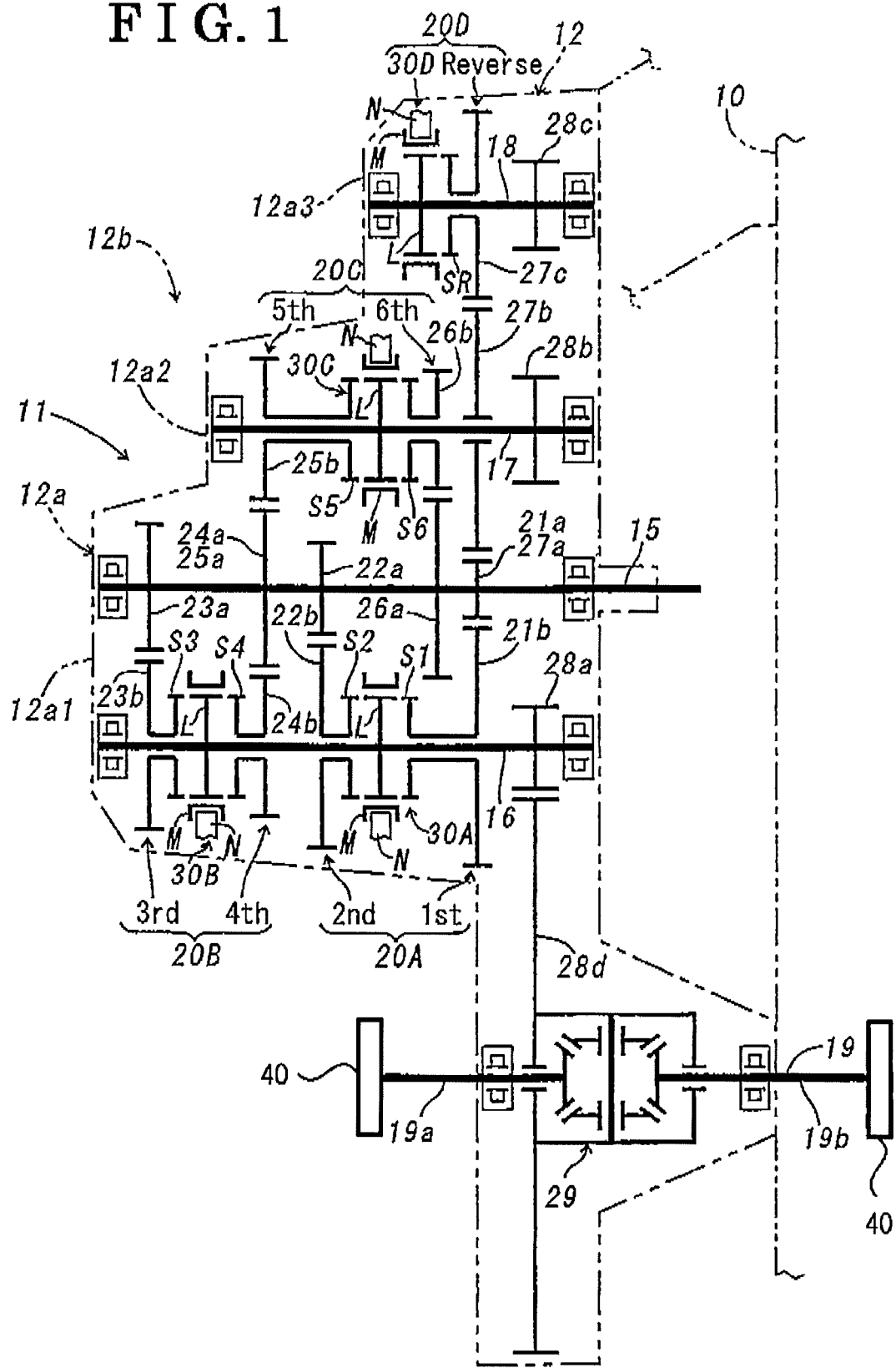
FIG. 1 is a view schematically illustrating an entire structure of an example of a transmission adapted to a vehicle in which axially connected engine and transmission is transversely mounted.

An embodiment of a transmission and a vehicle, to which the transmission and an engine connected in an axial direction thereof will be described below in accordance with FIGS. 1 to 3 of the attached drawings. FIG. 3 schematically illustrates a sectional view of a forward portion of the vehicle, viewed in lateral direction thereof, in a case where the axially connected engine and transmission of the embodiment is adapted to a front-engine front-drive type vehicle. An engine 10 and a transmission 11, connected with each other in the axial direction thereof, are transversely mounted between forward portions of left and right side frames 13 that serve as primary strength members and that extend along the both side portions of a vehicle body in a front-rear direction of the vehicle. The transmission 11 is arranged at the left of the engine 10 in FIG. 3. A cut-out portion 12b, which will be described below, is formed at an upper portion of a back wall portion 12a of a transmission case 12. The forward portion of the left side frame 13 of the left and right side frames 13, whose forward portion is upwardly curved for avoiding interference with a front axle, extends through the cut-out portion 12b formed at an upper portion of the back wall portion 12a of the transmission case 12.

Figure 2:
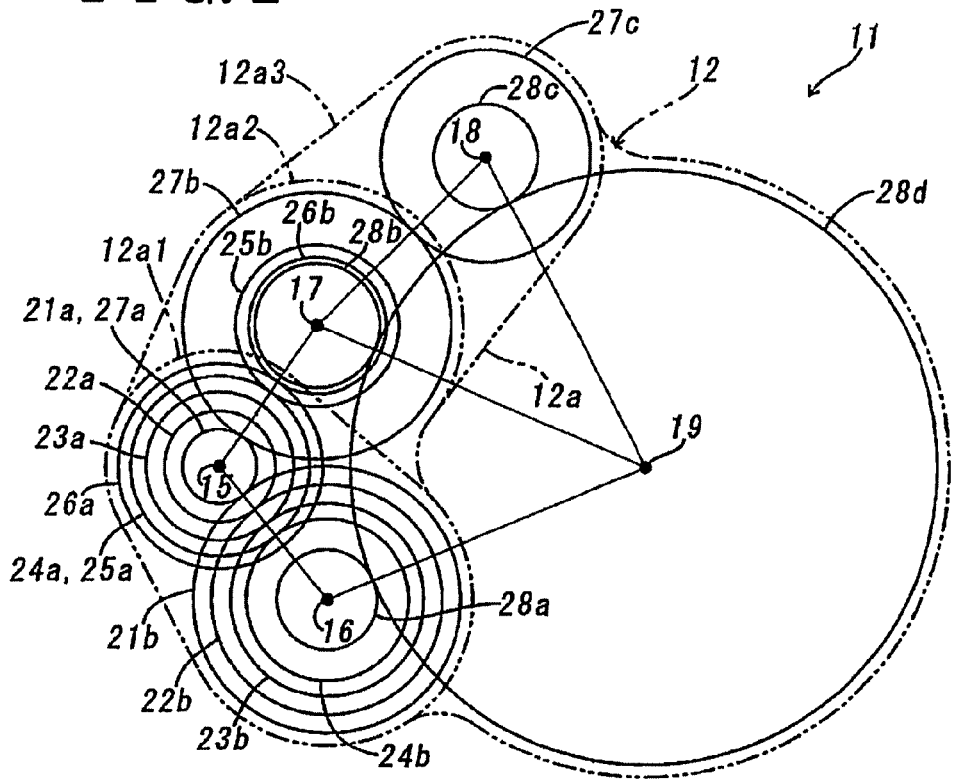
FIG. 2 is a view schematically illustrating the transmission viewed from the left side in FIG. 1.
Figure 3:
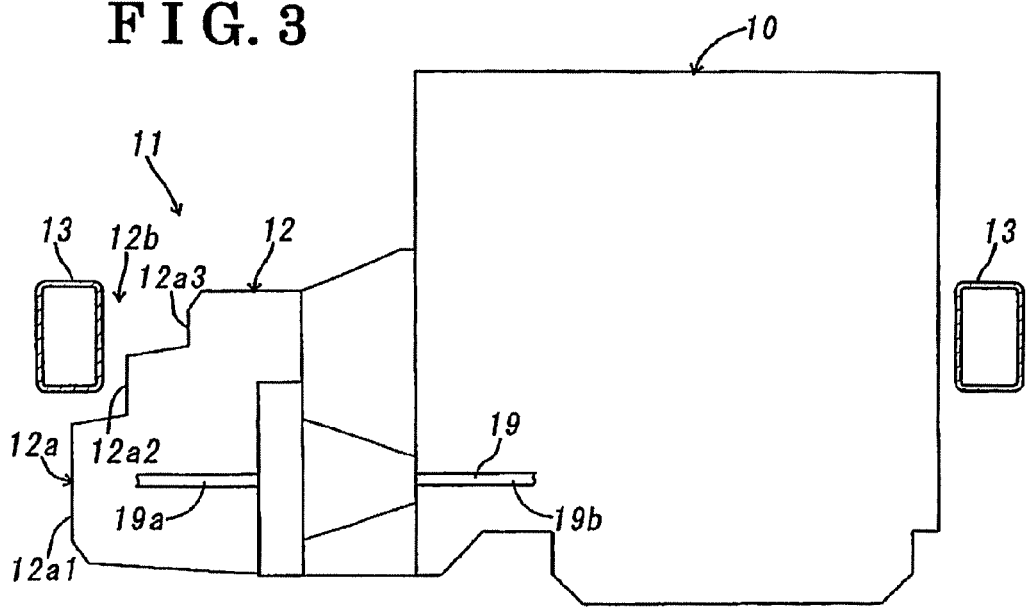
FIG. 3 is a view of a portion of the vehicle, viewed in lateral direction thereof, at which the axially connected engine and transmission is transversely mounted.
Figure 4:
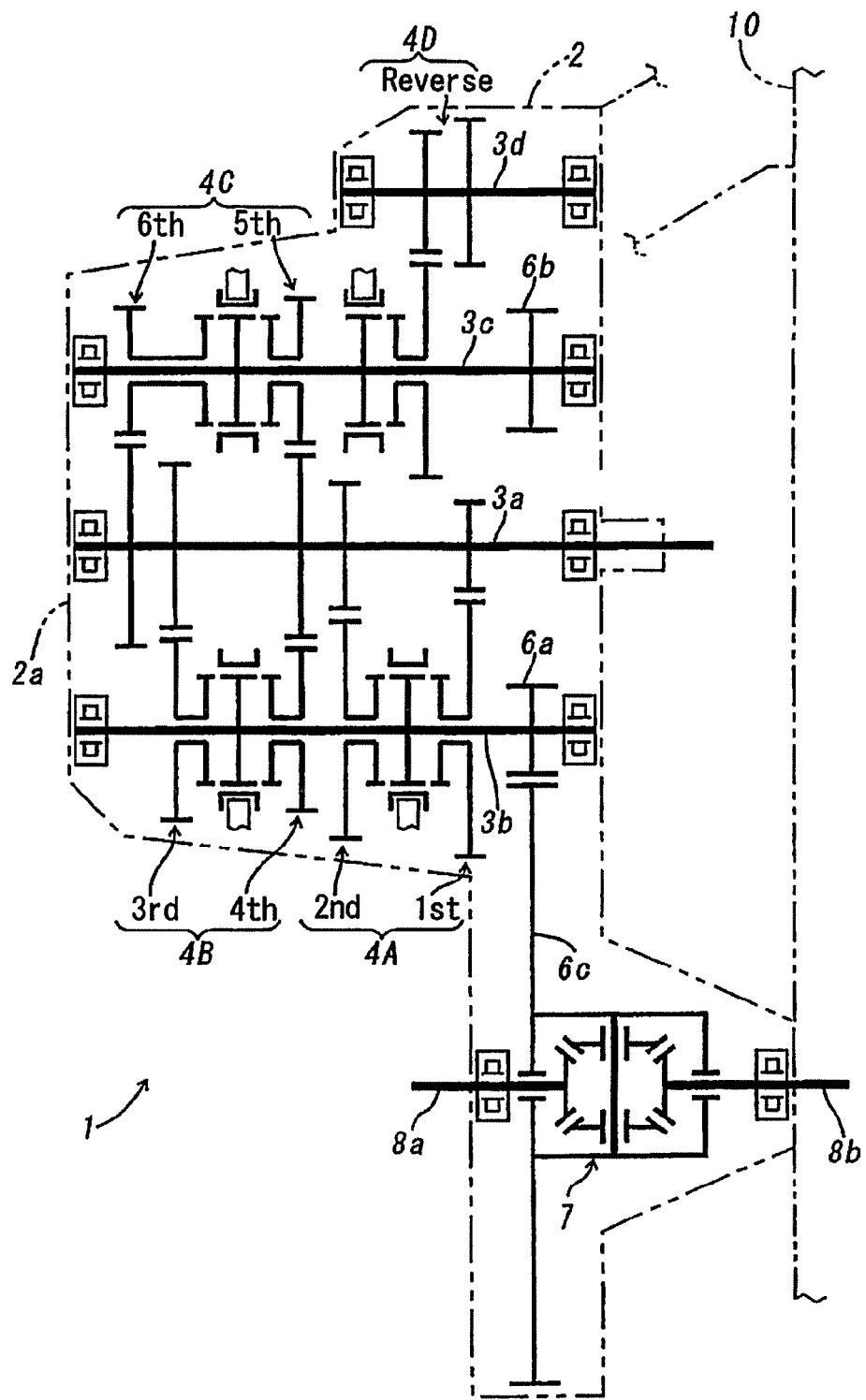
FIG. 4 is a view schematically illustrating an entire structure of an example of a conventional transmission.

As illustrated in FIGS. 1 and 2, the transmission 11 includes an input shaft 15 rotatably driven by the engine 10, an output shaft 19 connected to driving wheels 40, first and second counter shafts 16 and 17 and a reverse shaft 18 that are arranged parallel to the input shaft 15 and that are connected to the output shaft 19 via a reduction gear set 28a, 28b, 28c and 28d, a first forward movement gear switching unit 20A (a first gear mechanism) arranged between the input shaft 15 and the first counter shaft 16, a second forward movement gear switching unit 20B (a second gear mechanism) and a third forward movement gear switching unit 20C (a third gear mechanism) each of which is arranged between the input shaft 15 and the second counter shaft 17, a reverse movement gear switching unit 20D arranged between the input shaft 15 and the reverse shaft 18, and the transmission case 12. The transmission case 12 supports the input shaft 15, the first and second counter shaft 16 and 17, the reverse shaft 18, the output shaft 19, the first, second, and third forward movement gear switching units 20A, 20B, 20C and a reduction gear set 28a, 28b, 28c and 28d, most of which are accommodated therewithin. The reduction gear set 28a, 28b, 28c and 28d is arranged at a position which is the closest to the engine 10 among the gear sets within the transmission case 12. The first, second and third forward movement gear switching units 20A, 20B and 20C and the reverse movement switching unit 20D are positioned so as to be more distant from the engine 10 relative to the reduction gear set 28a, 28b, 28c and 28d.

As illustrated in FIGS. 1 and 3, the transmission 11 is arranged at one side of the engine 10 so as to be connected therewith in the axial direction of the engine 10. The transmission case 12 is fixed to the engine 10. A left end portion and a middle portion of the input shaft 15 in FIG. 1 is rotatably supported at the transmission case 12, and a right end portion of the input shaft 15 is connected to a crank shaft (not shown) of the engine 10 via a clutch (not shown). Both ends of each of the first counter shaft 16, the second counter shaft 17 and the reverse shaft 18 are rotatably supported at the transmission case 12. The output shaft 19 is formed with a first shaft 19a and a second shaft 19b that are coaxially connected via a differential mechanism 29 arranged within the transmission case 12. The first and second shafts 19a and 19b are rotatably supported by the transmission case 12. Further, each outer end portion of each of the first and second shafts 19a and 19b is connected to the corresponding driving wheel via a joint and a drive shaft (not shown). The smaller reduction gears 28a, 28b and 28c fixed at the first and second counter shafts 16 and 17 and the reverse shaft 18, respectively, engage with the reduction larger gear 28d, having a larger diameter than the reduction gears 27a, 28b and 28c and provided at the differential mechanism 29, thereby connecting the first and second counter shafts 16 and 17 and the reverse shaft 18 to the output shaft 19. 'Small', as used in the reduction small gears 28a, 28b and 28c, does not refer to specific size thereof, but rather because sizes of the reduction gears 28a, 28b, and 28c are smaller than the reduction gear 28d. Similarly, 'large', as used in the reduction large gear 28d, does not refer to a specific size thereof, but rather because a size of the reduction gear 28d is larger than other reduction gears 28a, 28b and 28c. Additionally, as illustrated in FIG. 2, the second counter shaft 17 and the reverse shaft 18 are positioned above the input shaft 15 and the first counter shaft 16 in this embodiment.

As illustrated in FIG. 1, the first forward movement gear switching unit 20A is arranged at a position relatively close to the engine 10. The second forward movement gear switching unit 20B is arranged at an position more distant from the engine 10 relative to the first movement gear switching unit 20A. The first forward movement gear switching unit 20A forms a 1st shift stage and a 2nd shift stage, and includes two pairs of gear sets arranged between the input shaft 15 and the first counter shaft 16, i.e. a 1st shift stage gear set (first gear set) 21a, 21b and a 2nd shift stage gear set (second gear set) 22a, 22b, and a first switching clutch 30A. The 1st shift stage gear set includes the driving gear 21a and the driven gear 21b, and the 2nd shift stage gear set includes the driving gear 22a and the driven gear 22b. The first switching clutch 30A is arranged between the 1st shift stage gear set 21a, 22b and the 2nd shift stage gear set 22a, 22b, and establishes a power (torque) transmission established by each of the 1st shift stage gear set 21a, 22b and the 2nd shift stage gear set 22a, 22b between the input shaft 15 and the first counter shaft 16. The driving gear 21a of the 1st shift stage gear set 21a and 21b and a driving gear 22a of the 2nd shift stage gear set 22a and 22b are fixed at the input shaft 15, and the driven gear 21b of the 1st shift stage gear set 21a and 21b and the driven gear 22b of the 2nd shift stage gear set 22a and 22b are rotatably provided at the first counter shaft 16. The first switching clutch 30A is provided between the driven gears 21b and 22b, and selectively connects either one of the driven gears 21b and 22b with rotation of the first counter shaft 16.

A known synchromesh mechanism is adapted to the first switching clutch 30A. The first switching clutch 30A incorporates therein a clutch hub L, fixed at the first counter shaft 16, a sleeve M spline-engaged with an outer periphery of the clutch hub L so as to be movable in an axial direction of the first counter shaft 16, and engaging members S1 and S2 that are integrally formed at the driven gears 21b and 22b, respectively and that are spline-engageable with the sleeve M. When the sleeve M of the first switching clutch 30A is shifted towards the driven gear 21b by means of a manually or automatically operated shift fork N from a neutral position illustrated in FIG. 1, the sleeve M is spline-engaged with the engaging member S1, and the driven gear 21b of the 1st shift stage gear set 21a and 21b is connected to the rotation of the first counter shaft 16. As a result, the 1st shift stage is established. Further, when the sleeve M is shifted towards the driven gear 22b by means of the shift fork N from the position where the 1st shift stage is established, firstly the engaging member S1 is disengaged from the sleeve M, and the sleeve M is returned to the neutral position. When the sleeve M is shifted further towards the driven gear 22b, the sleeve M is spline-engaged with the engaging member S2, and the driven gear 22b of the 2nd shift stage gear set 22a and 22b is connected to the rotation of the first counter shaft 16. As a result, the 2nd shift stage is established. When the sleeve M is shifted towards the driven gear 21b from the position where the 2nd shift stage is established, the sleeve M is returned to the neutral position.

The second forward movement gear switching unit 20B forms a 3rd shift stage and a 4th shift stage, and includes a 3rd shift stage gear set (third gear set) 23a, 23b and a 4th shift stage gear set (fourth gear set) 24a, 24b, both of which are arranged between the input shaft 15 and the first counter shaft 16, and a second switching clutch 30B arranged between the 3rd and second 4th stage gear sets. The 3rd shift stage gear set includes the driving gear 23a and the driven gear 23b, and the 4th shift stage gear set includes the driving gear 24a and the driven gear 24b. The second forward movement gear switching unit 20B is structured substantially the same as the first forward movement gear switching unit 20A. When a sleeve M of the second switching clutch 30B is shifted towards the driven gear 23b of the 3rd shift stage gear set 23a and 23b from a neutral position illustrated in FIG. 1, the 3rd shift stage is established by the substantially same manner as, for example, the 2nd shift stage is established. When the sleeve M is shifted towards the driven gear 24b of the 4th shift stage gear set 24a and 24b from the position where the 3rd shift stage is established, the sleeve M is returned to the neutral position. When the sleeve M is further shifted towards the driven gear 24b from the neutral position, the 4th shift stage is established. Further, when the sleeve M is shifted towards the driven gear 23b from the position where the 4th shift stage is established, the sleeve M is returned to the neutral position.

As is the case with the first forward movement gear switching unit 20A, the third forward movement gear switching unit 20C is arranged at a position relatively close to the engine 10. The third forward movement gear switching unit 20C forms a 5th shift stage and a 6th shift stage, and includes a 5th shift stage gear set (fifth gear set) 25a, 25b and a 6th shift stage gear set (sixth gear set) 26a, 26b, both of which are arranged between the input shaft 15 and the second counter shaft 17, and a third switching clutch 30C arranged between the 5th and 6th shift stage gear sets. The 5th shift stage gear set includes the driving gear 25a and the driven gear 25b, and the 6th shift stage gear set includes the driving gear 26a and the driven gear 26b. The third forward movement gear switching unit 20C is structured substantially the same as the first and second forward movement gear switching units 20A and 20B. When a sleeve M of the third switching clutch 30C is shifted towards the driven gear 25b of the 5th shift stage gear set 25a and 25b from a neutral position illustrated in FIG. 1, the 5th shift stage is established by the substantially same manner as, for example, the 1st shift stage is established. When the sleeve M is shifted towards the driven gear 26b of the 6th shift stage gear set 26a and 26b from the position where the 5th shift stage is established, the sleeve M is returned to the neutral position. When the sleeve M is further shifted towards the driven gear 26b from the neutral position, the 6th shift stage is established. Further, when the sleeve M is shifted towards the driven gear 25b from the position where the 6th shift stage is established, the sleeve M is returned to the neutral position.

The driving gear 25a of the 5th shift stage gear set 25a and 25b, arranged at the position more distant from the engine 10 at the third forward movement gear switching unit 20C relative to the driven gear 26a, is fixed at the input shaft 15 and serves also as the driving gear 24a of the fourth shift stage gear set 24a and 24b, arranged at the position close to the first forward movement gear switching unit 20A at the second forward movement gear switching unit 20B relative to the driven gear 23a. The driving gear 26a of the 6th shift stage gear set 26a and 26b, arranged at the position close to the engine 10 at the third forward movement gear switching unit 20C relative to the 5th shift stage gear set 25a and 25b, is fixed at the input shaft 15 so as to be arranged between the driving gear 21a of the 1st shift stage gear set 21a, 21b and the driving gear 22a of the 2nd shift stage gear set 22a, 22b of the first forward movement gear switching unit 20A.

As illustrated in FIGS. 1 and 2, the reverse movement gear switching unit 20D forms a reverse movement shift stage and is arranged at a position close to the engine 10 relative to a reverse movement switching clutch 30D as is the case with the first forward movement gear switching unit 20A. The reverse movement gear switching unit 20D includes a reverse gear set, arranged between the input shaft 15, the first counter shaft 16 and the reverse shaft 18, and the reverse movement switching clutch 30D is configured to establish a power transmission path established by the reverse gear set between the input shaft 15 and the reverse shaft 18. The reverse gear set is formed with a driving gear 27a, an idler gear 27b and a driven gear 27c that are arranged between the third forward movement gear switching unit 20C and the reduction gear set 28a, 28b, 28c and 28d. The driving gear 27a serves also as the driving gear 21a of the 1st shift stage gear set 21a and 21b. Further, the idler gear 27b is rotatably supported at the second counter shaft 17. The driven gear 27c is rotatably supported at the reverse shaft 18. The reverse movement switching clutch 30D is provided at the reverse movement shaft 18 so as to be arranged in parallel to driven gear 27c so as to establish a power transmission path between the driven gear 27c and the reverse shaft 18. The reverse movement switching clutch 30D has substantially the same structure as the first switching clutch 30A except that the reverse movement switching clutch 30D includes only an engaging member SR fixed at the driven gear 27c, arranged at one side of the reverse movement switching clutch 30D, in an axial direction of the reverse shaft 18. When a sleeve M of the reverse movement switching clutch 30D is shifted towards the driven gear 27c from a neutral position illustrated in FIG. 1 by means of a shift fork N, the sleeve M is spline-engaged with the engaging member SR, and the driven gear 27c of the reverse gear set is connected to the reverse shaft 18. As a result, a reverse shift stage is established. When the sleeve M is shifted in a reverse direction to be away from the driven gear 27c at the state where the reverse shift stage is established, the sleeve M is disengaged from the engaging member SR, and the reverse shift stage is cancelled.

In the above-described embodiment, the first forward movement gear switching unit 20A, the third forward movement gear switching unit 20C and the reverse movement gear switching unit 20D are arranged at the positions relatively close to the engine 10 within the transmission case 12 and the second forward movement gear switching unit 20C is arranged at a position more remote from the engine 10 relative to the first forward movement gear switching unit 20A. Further, a length of the reverse movement switching unit 20D in the axial direction is defined to be shorter than a length of the third forward movement gear switching unit 20C in the axial direction because the reverse movement switching unit 20D includes the driven gear 27c at only one side of the reverse movement switching clutch 30D while the third forward movement gear switching unit 20C includes the driven gears 25b and 26b at both sides of the forward movement switching clutch 30C. Therefore, among end portions which are spaced from the engine 10 of each of the second forward movement gear switching unit 20B, the third forward movement gear switching unit 20C and the reverse movement gear switching unit 20D, the end portion of the second forward movement gear switching unit is arranged to be farthest from the engine 10 and the end portion of the reverse movement gear switching unit 20D is arranged closest to the engine 10 in the axial direction of the input shaft 15. Further, the second counter shaft 17, at which the driven gears 25b and 26b of the third forward movement gear switching unit 20C and the third switching clutch 30C are provided, is arranged above the input shaft 15, at which the first forward movement switching unit 20A and the second forward movement switching unit 20B are provided, and above the first counter shaft 16. The reverse shaft 18, at which the driven gear 27c of the reverse movement gear switching unit 20D and the reverse movement gear switching clutch 30D are provided, is arranged further above the input shaft 15 than the second counter shaft 17. As illustrated in FIGS. 1 and 3 the transmission case 12 forms the cut-out portion 12b at the back wall portion 12a thereof.

Figure 5:
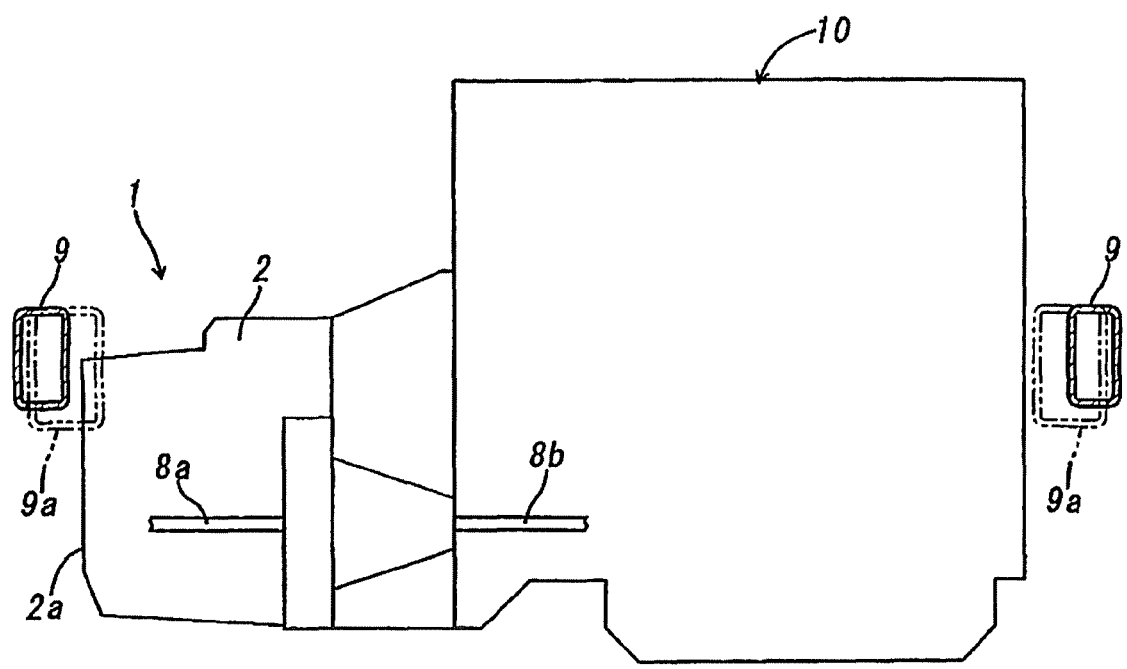
FIG. 5 is a sectional view of the vehicle, viewed in lateral direction thereof, at which the axially connected engine and the conventional transmission transversely mounted.

Hence, as illustrated in FIG. 3, in a case where the transmission 11 and the engine 10 are arranged in the axial direction thereof so as to be integrally connected with each other and then the integrally and axially connected transmission 11 and engine 10 is transversely mounted at the forward portion of the vehicle body, the upwardly curved forward portion of one of the right and left side frames 13, serving as the strength member, is arranged so as to extend through the cut-out portion 12b of the transmission case 12. As a result, even in a case where axially connected transmission 11 and the engine 10 of the embodiment is adapted to a vehicle having side frames having the enlarged cross-sectional shapes and linearized linearized shapes, as illustrated in FIG. 3, one of the side frames 13 is prevented from interfering with the transmission case 12 because the one of the side frames 13 extends through the cut-out portion 12b of the transmission case 12, compared to a case where the conventional transmission 1 interfered with one of the side frames 9a having the enlarged cross-sectional shapes and linearized shapes when then conventional transmission 1 and the engine 10 are axially connected and transversely mounted on the vehicle body, as illustrated in FIG. 5 Hence, the axially connected transmission 11 and engine 10 is transversely mountable on the vehicle body without causing interference between one of the side frames 13 and the transmission case 12.

In the above-described embodiment, the driving gear 25a of the 5th shift stage gear set 25a and 25b, arranged more distant from the engine 10 at the third forward movement gear switching unit 20C relative to the 6th shift stage gear set 26a, 26b, serves also as the driving gear 24a of the 4th shift stage gear set 24a and 24b, arranged at the second forward movement gear switching unit 20B which is arranged closer to the first forward movement gear switching unit 20A at the second forward movement gear switching unit 20B. The driving gear 26a of the 6th shift stage gear set 26a and 26b, positioned close to the engine at the third forward movement gear switching unit 20C relative to the 5th shift stage gear set, is fixed at the input shaft 15 between the driving gears 21a of the 1st shift stage gear set 21a, 21b and the driving gear 22a of the 2nd shift stage gear set 22a, 22b. The driving gear 26a does not serve as the driving gear 21a. As a result, one of the plural gears at the plural forward movement shift stage gear sets, 21a and 21b, 22a and 22b, 23a and 23b, and 24a and 24b, provided between the input shaft 15 and the first counter shaft 16 is eliminated by one gear serving as driving gears of two forward movement shift stages, and similarly, one of the plural gears at the plural shift stage gear sets, 25a and 25b, and 26a and 26b, provided between the input shaft 15 and the second counter shaft 17, is eliminated by one gear serving as driving gears of two forward movement shift stages. Therefore, the structure of the transmission 11 is simplified, and length of the input shaft 15 and the counter shaft 16 are shortened. Further, instead of serving also as the driving gear 24a, the driving gear 25a may serve also as the driving gear 22a. Even in the case where the driving gear 25a of the 5th shift stage gear set 25a and 25b serves also as the driving gear 22a of the 2nd shift stage gear set 22a and 22b, the same effects and advantages are achieved. In this case, the length of the second counter shaft 17 is further shortened relative to the input shaft 15 and first counter shaft 16.

The embodiment above describes the transmission having the reverse movement gear switching unit 20D. However, the present invention described in the embodiment is adaptable to a transmission not having a reverse movement gear switching unit. Even in a case where the present invention is adapted to the transmission not having the reverse movement gear switching unit, most of the effects and advantages described above in the embodiment will be achieved.

Further, in the transmission 11 of the first and second embodiments, the first forward movement gear switching unit 20A includes the 1st shift stage gear set 21a, 21b, the 2nd shift stage gear set 22a, 22b and the first switching clutch 30A that is provided therebetween and establishes the power transmission path established by each of the 1st shift stage gear set 21a, 21b and the 2nd shift stage gear set 22a, 22b between the input shaft 15 and the first counter shaft 16, the second forward movement gear switching unit 20B includes the 3rd shift stage gear set 23a, 23b, the 4th shift stage gear set 24a, 24b and the second switching clutch 30B that is provided therebetween and establishes the power transmission path established by each of the 3rd shift stage gear set 23a, 23b and the 4th shift stage gear set 24a, 24b between the input shaft 15 and the first counter shaft 16, and the third forward movement gear switching unit 20C includes the 5th shift stage gear set 25a, 25b, the 6th shift stage gear set 26a, 26b and the third switching clutch 30C that is provided therebetween and establishes the power transmission path established by each of the 5th shift stage gear set 25a, 25b and the 6th shift stage gear set 26a, 26b between the input shaft 15 and the second counter shaft 17. Accordingly, the transmission 11 is structured to have six shift stages which is a maximum number of shift stages for a transmission having three forward movement gear switching units. Hence, output torque of the transmission 11 is increased. The present invention is not limited to the above-described embodiment, but one or more of the first, second and third forward movement gear switching units 20A, 20B and 20C may include only one forward movement shift stage gear set.

In the above-described embodiment, the first forward movement shift stage gear set is assigned as the 1st shift stage gear set 21a and 21b, the second forward movement shift stage gear set is assigned as the 2nd shift stage gear set 22a and 22b, the third forward movement shift stage gear set is assigned as the 3rd shift stage gear set 23a and 23b, the fourth forward movement shift stage gear set is assigned as the 4th shift stage gear set 24a and 24b, the fifth forward movement shift stage gear set is assigned as the 5th shift stage gear set 25a and 25b, and the sixth forward movement shift stage gear set is assigned as the 6th shift stage gear set 26a and 26b. However, each shift stage may be assigned at any desired forward movement shift stage gear set arranged at the positions illustrated in FIGS. 1 and 2.

Further, the axially connected transmission 11 and the engine 10, adapted to the front-engine front-drive type vehicle, is described above. The present invention is not limited to be adapted to the front-engine front-drive type vehicle, but the present invention is also adaptable to a rear-engine rear-drive type vehicle.

According, the first forward movement gear switching unit 20A and the third forward movement gear switching unit 20C are arranged relatively close to the engine 10 within the transmission case 12, and the second forward movement gear switching unit 20B is arranged more distant from the engine 10 relative to the first forward movement gear switching unit 20A. The second counter shaft 17 is arranged above the input shaft 15 and the first counter shaft 16. As a result, the transmission case 12, located at the more distant side of the engine 10, is formed to have the first back wall portion 12a1 corresponding to the first and second forward movement gear switching units 20A and 20B and the second back wall portion 12a2 corresponding to a portion of the third forward movement gear switching unit 20C, wherein the second back wall portion 12a2 is located closer to the engine 10 than the first back wall portion 12a1 arranged below the second back wall portion 12a2. As a result, the transmission case 12 forms the cut-out portion 12b at the upper portion of the back wall 12a. By adapting the above-structured transmission 11, the transmission 11 and the engine 10 are connected in the axial direction thereof, and the axially connected transmission 11 and engine 10 is transversely mounted on the vehicle body so that one of the side frames 13, extending along the both sides of the vehicle body in the front-rear direction thereof, extends through the cut-out portion 12a of the transmission case 12. As a result, even in a case where axially connected transmission 11 and the engine 10 of the first embodiment is adapted to a vehicle having side frames having the enlarged cross-sectional shapes and linearlized shapes, as illustrated in FIG. 3, one of the side frames 13 is prevented from interfering with the transmission case 12 because the one of the side frames 13 extends through the cut-out portion 12b of the transmission case 12, compared to a case where the conventional transmission 1 interferes with the one of the side frames 9a. Hence, the axially connected transmission 11 and engine 10 is transversely mountable on the vehicle body without causing the interference between one of the side frames 13 and the transmission case 12. Further, as the driving gear 25a of the 5th shift stage gear set 25a and 25b arranged more distant from the engine 10 at the third forward movement gear switching unit 20D relative to the 6th shift stage gear set 26a and 26b is fixed at the input shaft 15 and serves also as the driving gear 22a of the 2nd shift stage gear set 22a and 22b arranged close to the second forward gear switching unit 20B at the first forward gear switching unit 20A or the driving gear 24a of the 4th shift stage gear set 24a and 24b arranged close to the first forward movement gear switching unit 20A at the second forward gear switching unit 20B, one of the driving gears is eliminated. As a result, the structure of the transmission 11 is simplified and the transmission 11 is downsized.

According to the embodiments, the transmission 11 transversely mounted on the vehicle includes a reverse movement gear switching unit 20D including a reverse shaft 18 arranged in parallel to the input shaft 15 and connected to the output shaft 19, a reverse gear set provided between the input shaft 15 and the reverse shaft 18 and a reverse movement switching clutch 30D establishing a power transmission path established by the reverse gear set between the input shaft 15 and the reverse shaft 18, wherein the 1st shift stage gear set 21a, 21b arranged more distant from the engine 10 relative to the 2nd shift stage gear set 22a, 22b is set as a gear set for a low speed shift stage, the reverse gear set 20D includes a driving gear 27a provided at the input shaft 15, an idler gear 27b rotatably supported at the first counter shaft 16 or the second counter shaft 17 and a driven gear 17c rotatably provided at the reverse shaft 18 wherein the driving gear 27a of the reverse gear set serves also as a driving gear 21a of the 1st shift stage gear set 21a, 21b of first forward movement gear switching unit 20A, arranged closer to the engine 10 relative to the 2nd shift stage gear set 22a, 22b.

Accordingly, the transmission 11 further includes the reverse shaft 18 arranged in parallel to the input shaft 15 and connected to the output shaft 19, and the reverse movement gear switching unit 20D provided between the input shaft 15 and the reverse shaft 18 and formed with the pair of the reverse gear set and the reverse movement switching clutch 30D that is configured to establish the power transmission path established by the reverse gear set between the input shaft 15 and the reverse shaft 18. The forward movement shift stage gear set 21a and 21b of the first forward movement gear switching unit 20A arranged more distant from the engine 10 is a gear set for low speed shift stage. The reverse gear set is formed with the driving gear 27a provided at the input shaft 15, the driven gear 27c rotatably supported at the reverse shaft 18 and the idler gear 27b rotatably supported at the second counter shaft 17 and engaged with the driving gear 27a and the driven gear 27c. The driving gear 27a of the reverse gear set serves also as the driving gear 21a of the first shift stage gear set 21a and 21b of the first forward movement gear switching unit 20A which is arranged close to the engine 10 relative to the second forward movement gear switching unit 20B. Accordingly, the reverse movement gear switching unit 20D provided at the input shaft 15, the first counter shaft 16 and the reverse shaft 18 is arranged close to the engine 10 substantially in the same manner as the first and third gear switching units 20A and 20C. Therefore, the second back wall portion 12a2 of the back wall portion 12a of the transmission case 12 is arranged closer to the engine 10 than the first back wall portion 12a1 of the back wall portion 12a of the transmission case 12 so as to form the cut-out portion 12b at of the upper back wall portion 12a of the transmission case 12. Therefore, even in the case where the reverse movement gear switching unit 20D is provided within the transmission case 12, one of the side frames 13 is provided so as to extend through the cut-out portion 12b in the front-rear direction of the vehicle, so that one of the side frames 13 does not interfere with the transmission case 12. As a result, the axially connected engine 10 and transmission 11 is transversely mountable on the vehicle body. As the driving gear 21a of the 1st shift stage gear set 21a and 21b of the first forward movement gear switching unit 20A, serving also as the driving gear 27a of the reverse gear set, is the gear of the low speed shift stage, the reduction gear ratio of the reverse gear set is easily increased.

According to the embodiment the first forward movement gear switching unit 20A includes the 1st shift stage gear set, 21a, 21b, the 2nd shift stage gear set 22a, 22b, and the first switching clutch arranged therebetween and establishing the power transmission path established by each of the 1st shift stage gear set 21a, 21b and the 2nd shift stage gear set 22a, 22b between the input shaft 15 and the first counter shaft 16, the second forward movement gear switching unit 20B includes the 3rd shift stage gear set 23a, 23b, the 4th shift stage gear set 24a, 24b and the second switching clutch 30B arranged therebetween and establishing the power transmission path established by each of the 3rd shift stage gear set 23a, 23b and the 4th shift stage gear set 24a, 24b between the input shaft 15 and the first counter shaft 16, and the third forward movement gear switching unit 20C includes the 5th shift stage gear set 25a, 25b, the 6th shift stage gear set 26a, 26b, and the third switching clutch 30C arranged therebetween and establishing the power transmission path established by each of the 5th shift stage gear set 25a, 25b and the 6th shift stage gear set 26a, 26b between the input shaft 15 and the second counter shaft 17.

Accordingly, the first forward movement gear switching unit 20A includes the 1st shift stage gear set 21a, the 2nd shift stage gear set 22a 22b, and the first switching clutch 30A arranged therebetween and establishes the power transmission path established by each of the 1st shift stage gear set 21a, 21b and the 2nd shift stage gear set 22a, 22b between the input shaft 15 and the first counter shaft 16, the second forward movement gear switching unit 20B includes the 3rd shift stage gear set 23a, 23b, the 4th shift stage gear set 24a 24b, and the second switching clutch 30B arranged therebetween and establishes the power transmission path established by each of the 3rd shift stage gear set 23a, 23b and the 4th shift stage gear set 24a, 24b between the input shaft 15 and the first counter shaft 16 and the third forward movement gear switching unit 20C includes the 5th shift stage gear set 25a, 25b, the 5th shift stage gear set 26a 26b, and the third switching clutch 30C arranged therebetween and establishes the power transmission path established by each of the 5th shift stage gear set 25a, 25b and the 6th shift stage gear set 26a, 26b between the input shaft 15 and the second counter shaft 17. Hence, the transmission 11 is structured to have six shift stages which is a maximum number of shift stages for a transmission having three forward movement gear switching units.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A vehicle comprising:
   an engine;
   a pair of side frames provided at the vehicle so as to extend along both sides of a vehicle body in a front-rear direction of the vehicle;
   a transmission adapted to be axially connected with the engine and adapted to be transversely mounted on a vehicle body, comprising:
   an input shaft adapted to be rotatably driven by the engine;
   an output shaft connected to a driving wheel;
   a first counter shaft arranged in parallel to the input shaft and connected to the output shaft;
   a second counter shaft arranged in parallel to the input shaft and connected to the output shaft;
   a first gear mechanism arranged between the input shaft and the first counter shaft, the first gear mechanism having a first gear set, a second gear set, and a first switching clutch to selectively establish a power transmission path between the input shaft and the first counter shaft via the first gear set or the second gear set;
   a second gear mechanism provided between the input shaft and the first counter shaft, the second and first gear mechanisms extending parallel to one another between the input shaft and the first counter shaft, the second gear mechanism having a third gear set, a fourth gear set, and a second switching clutch to selectively establish a power transmission path between the input shaft and the first counter shaft via the third gear set or the fourth gear set;
   a third gear mechanism between the input shaft and the second counter shaft, the third gear mechanism having a fifth gear set, a sixth gear set, and a third switching clutch to selectively establish a power transmission path between the input shaft and the second counter shaft via the fifth gear set or the sixth gear set; and
   a transmission case supporting and covering the input shaft, the first counter shaft, the second counter shaft, the output shaft, the first gear mechanism, the second gear mechanism and the third gear mechanism; wherein
   the first gear mechanism and the third gear mechanism are arranged relatively close to the engine, the second gear mechanism is arranged at a position more distant from the engine than the first gear mechanism, and the second counter shaft is arranged above the input shaft and the first counter shaft, and
   the transmission case includes a back wall portion located at a position spaced from the engine and formed with
   a first back wall portion aligned with the first gear mechanism and the second gear mechanism and
   a second back wall portion corresponding to the third gear mechanism and located closer to the engine than the first back wall portion, thereby forming a cut-out portion at an upper portion of the back wall portion,
   the transmission is connected to the engine and transversely mounted on the vehicle body so that one of the side frames extending along both sides of the vehicle body in a front-rear direction thereof extends through the cut-out portion, either a driving gear of the second gear set arranged close to the second gear mechanism relative to the first gear set at the first gear mechanism and provided at the input shaft, or a driving gear of the fourth gear set arranged close to the first gear mechanism relative to the third gear set at the second gear mechanism and provided at the input shaft serves also as a driving gear of the fifth gear set arranged at a position more distant from the engine relative to the sixth gear set at the third gear mechanism;
   a reverse movement gear switching unit including a reverse shaft arranged in parallel to the input shaft and connected to the output shaft, a reverse gear set provided between the input shaft and the reverse shaft and a reverse movement switching clutch for selectively establishing a power transmission path via the reverse gear set between the input shaft and the reverse shaft, and wherein
   the reverse gear set includes a driving gear provided at the input shaft, an idler gear rotatably supported at the first counter shaft or the second counter shaft and a driven gear rotatably provided at the reverse shaft wherein the driving gear of the reverse gear set serves also as a driving gear of the first gear set of the first gear mechanism, the first gear set of the first gear mechanism is a gear set for a low speed shift stage and is arranged closer to the engine relative to the second gear set.

2. The vehicle according to claim 1, wherein
   the first gear mechanism includes the first gear set, the second gear set and the first switching clutch arranged therebetween for selectively establishing a first or a second speed range power transmission path between the input shaft and the first counter shaft,
   the second gear mechanism includes the third gear set, the fourth gear set and the second switching clutch arranged therebetween for selectively establishing a third or a fourth speed range power transmission path between the input shaft and the first counter shaft, and
   the third gear mechanism includes the fifth gear set, the sixth gear set and the third switching clutch arranged therebetween for selectively establishing a fifth or a sixth speed range power transmission path between the input shaft and the second counter shaft.

3. A transmission adapted to be axially connected with an engine and adapted to be transversely mounted on a vehicle body, comprising:
- an input shaft adapted to be rotatably driven by the engine;
- an output shaft connected to a driving wheel;
- a first counter shaft arranged in parallel to the input shaft and connected to the output shaft;
- a second counter shaft arranged in parallel to the input shaft and connected to the output shaft;
- a first gear mechanism arranged between the input shaft and the first counter shaft, the first gear mechanism having a first gear set, a second gear set, and a first switching clutch to selectively establish a power transmission path between the input shaft and the first counter shaft via the first gear set or the second gear set;
- a second gear mechanism provided between the input shaft and the first counter shaft, the second and first gear mechanisms extending parallel to one another between the input shaft and the first counter shaft, the second gear mechanism having a third gear set, a fourth gear set, and a second switching clutch to selectively establish a power transmission path between the input shaft and the first counter shaft via the third gear set or the fourth gear set;
- a third gear mechanism between the input shaft and the second counter shaft, the third gear mechanism having a fifth gear set, a sixth gear set, and a third switching clutch to selectively establish a power transmission path between the input shaft and the second counter shaft via the fifth gear set or the sixth gear set; and
- a transmission case supporting and covering the input shaft, the first counter shaft, the second counter shaft, the output shaft, the first gear mechanism, the second gear mechanism and the third gear mechanism; wherein the first gear mechanism and the third gear mechanism are arranged relatively close to the engine, the second gear mechanism is arranged at a position more distant from the engine than the first gear mechanism, and the second counter shaft is arranged above the input shaft and the first counter shaft, and the transmission case includes a back wall portion located at a position spaced from the engine and formed with a first back wall portion aligned with the first gear mechanism and the second gear mechanism and a second back wall portion corresponding to the third gear mechanism and located closer to the engine than the first back wall portion, thereby forming a cut-out portion at an upper portion of the back wall portion, and wherein the transmission is adapted to be connected to the engine and transversely mounted on the vehicle body so that one of a pair of side frames extending along both sides of the vehicle body in a front-rear direction thereof extends through the cut-out portion, either a driving gear of the second gear set arranged close to the second gear mechanism relative to the first gear set at the first gear mechanism and provided at the input shaft, or a driving gear of the fourth gear set arranged close to the first gear mechanism relative to the third gear set at the second gear mechanism and provided at the input shaft serves also as a driving gear of the fifth gear set arranged at a position more distant from the engine relative to the sixth gear set at the third gear mechanism;

a reverse movement gear switching unit including a reverse shaft arranged in parallel to the input shaft and connected to the output shaft, a reverse gear set provided between the input shaft and the reverse shaft and a reverse movement switching clutch for selectively establishing a power transmission path via the reverse gear set between the input shaft and the reverse shaft, and the reverse gear set includes a driving gear provided at the input shaft, an idler gear rotatably supported at the first counter shaft or the second counter shaft and a driven gear rotatably provided at the reverse shaft wherein the driving gear of the reverse gear set serves also as a driving gear of the first gear set of the first gear mechanism, the first gear set of the first gear mechanism is a gear set for a low speed shift stage and is arranged closer to the engine relative to the second gear set.

4. The transmission according to claim 3, wherein:
the first gear mechanism includes the first gear set, the second gear set and the first switching clutch arranged therebetween for selectively establishing a first or a second speed range power transmission path between the input shaft and the first counter shaft, the second gear mechanism includes the third gear set, the fourth gear set and the second switching clutch arranged therebetween for selectively establishing a third or a fourth speed range power transmission path between the input shaft and the first counter shaft, and the third gear mechanism includes the fifth gear set, the sixth gear set and the third switching clutch arranged therebetween for selectively establishing a fifth or a sixth speed range power transmission path between the input shaft and the second counter shaft.

* * * * *